United States Patent
Lee

(10) Patent No.: US 11,409,470 B2
(45) Date of Patent: Aug. 9, 2022

(54) MEMORY SYSTEM, MEMORY CONTROLLER, AND METHOD OF OPERATING MEMORY SYSTEM

(71) Applicant: SK hynix Inc., Gyeonggi-do (KR)

(72) Inventor: Hyun Jun Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 31 days.

(21) Appl. No.: 17/148,071

(22) Filed: Jan. 13, 2021

(65) Prior Publication Data

US 2021/0397377 A1    Dec. 23, 2021

(30) Foreign Application Priority Data

Jun. 22, 2020 (KR) .................. 10-2020-0075461

(51) Int. Cl.
*G06F 3/06* (2006.01)
*G06F 1/30* (2006.01)

(52) U.S. Cl.
CPC .............. *G06F 3/0659* (2013.01); *G06F 1/30* (2013.01); *G06F 3/0625* (2013.01); *G06F 3/0676* (2013.01); *G06F 3/0679* (2013.01)

(58) Field of Classification Search
CPC ........ G06F 1/30; G06F 3/0659; G06F 3/0625; G06F 3/0676; G06F 3/0679
See application file for complete search history.

(56) References Cited

U.S. PATENT DOCUMENTS

| | | | | |
|---|---|---|---|---|
| 2009/0063065 A1* | 3/2009 | Weekly | ..................... | G06F 1/28 702/64 |
| 2017/0185335 A1* | 6/2017 | Pardoe | .................. | G06F 1/3206 |
| 2018/0059968 A1* | 3/2018 | Jung | ........................ | G11C 7/20 |
| 2018/0068706 A1* | 3/2018 | Yoo | ..................... | G11C 11/4085 |
| 2018/0107412 A1* | 4/2018 | Jun | ..................... | G06F 11/1435 |
| 2018/0276092 A1* | 9/2018 | Nelson | ................ | G06F 11/1441 |
| 2018/0349045 A1* | 12/2018 | Koo | ........................ | G06F 3/0619 |
| 2019/0042113 A1* | 2/2019 | Li | ........................... | G06F 1/263 |
| 2019/0056887 A1* | 2/2019 | Park | ....................... | G11C 16/10 |
| 2019/0369911 A1* | 12/2019 | Rai | ....................... | G06F 3/0679 |
| 2020/0004636 A1* | 1/2020 | Secatch | .............. | G06F 12/0246 |
| 2020/0097422 A1* | 3/2020 | Benisty | .............. | G06F 13/1668 |
| 2020/0285420 A1* | 9/2020 | Guim Bernat | ............ | G06F 1/30 |
| 2021/0141433 A1* | 5/2021 | Watt | ......................... | G06F 1/30 |

FOREIGN PATENT DOCUMENTS

| KR | 10-2011-0041675 | 4/2011 |
|---|---|---|
| KR | 10-2019-0132003 | 11/2019 |

\* cited by examiner

*Primary Examiner* — Nicholas J Simonetti
(74) *Attorney, Agent, or Firm* — IP & T Group LLP

(57) ABSTRACT

Embodiments of the present disclosure relate to a memory system, a memory controller, and a method of operating the memory system. According to the embodiments of the present disclosure, the memory system may search for a target command, to be processed before entering a power-off state, in a plurality of command queues that queue commands to be inputted to the memory device when a sudden power off (SPO) signal is transmitted from a power management core to a flash interface layer core, may enqueue the target command into a top priority command queue having the highest priority among the plurality of command queues, and may input the target command enqueued into the top priority command queue to the memory device before entering the power-off state.

19 Claims, 13 Drawing Sheets

FIG.10

| Command Queue | before SPO | after SPO |
|---|---|---|
| CMD_Q_TOP | – | Meta Write |
| CMD_Q_1 | Host Read | Host Read, Internal Read |
| CMD_Q_2 | Internal Read, Program, Erase, Meta Write | Program, Erase |

MEMORY SYSTEM, MEMORY CONTROLLER, AND METHOD OF OPERATING MEMORY SYSTEM

CROSS REFERENCE TO RELATED APPLICATION

The present application claims priority under 35 U.S.C. 119(a) to Korean patent application number 10-2020-0075461, filed on Jun. 22, 2020, which is incorporated herein by reference in its entirety.

BACKGROUND

1. Field of the Invention

Embodiments of the present disclosure relate to a memory system, a memory controller, and a method of operating the memory system.

2. Description of the Prior Art

A memory system, e.g., a storage device, stores data on the basis of a request from a host, such as a computer, a mobile terminal (for example, a smartphone or a tablet), or any of various other electronic devices. The memory system may be a type of device that stores data in a magnetic disk such as a hard disk drive (HDD), or a type of device that stores data in a nonvolatile memory such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute or control operations for reading, writing, or erasing data in a volatile memory or a nonvolatile memory included in the memory system. The memory controller may drive firmware for performing a logical operation for controlling such operations.

When sudden power off (SPO) occurs, the memory system may dump data in the volatile memory to the memory device. Thereafter, the memory system may perform a recovery operation using the dumped data at the time of power-on to recover the data in the state before SPO occurs. To minimize the time required in the process of dumping data in the volatile memory to the memory device, the memory system may permit continued execution of an operation that must be completed among the currently executed operations and may abort the remaining operations.

SUMMARY

Embodiments of the present disclosure may provide a memory system, a memory controller, and a method of operating the memory system, which can reduce the time required to dump data to the memory device when sudden power off (SPO) occurs.

In addition, embodiments of the present disclosure may provide a memory system, a memory controller, and a method of operating the memory system, which can reduce the time required in a recovery process after SPO occurs.

In one aspect, embodiments of the present disclosure may provide a memory system including a memory device and a memory controller for controlling the memory device.

When an SPO signal is transmitted from a power management core to a flash interface layer core, the memory controller may search for a target command, to be processed before entering a power-off state, in a plurality of command queues that queue commands to be inputted to the memory device.

The memory controller may enqueue the target command in a top priority command queue having the highest priority among the plurality of command queues.

The memory controller may input the target command enqueued into the top priority command queue to the memory device before entering the power-off state.

The top priority command queue may be in an empty state before SPO occurs.

The target command may be for requesting an operation of writing meta-data.

The plurality of command queues may further include a first priority command queue and a second priority command queue. The memory controller may process a command in the first priority command queue with higher priority than a command in the second priority command queue. After SPO occurs, the memory controller may enqueue a command for requesting an internal read operation into the first priority command queue.

The memory controller may enqueue the target command into the top priority command queue until a command for requesting to abort a corresponding operation is transmitted to the flash interface layer core.

The SPO signal may be directly transmitted from the power management core to the flash interface layer core.

In another aspect, embodiments of the present disclosure may provide a memory controller including a memory interface configured to communicate with a memory device and a memory controller configured to include a control circuit for controlling the memory device.

When an SPO signal is transmitted from a power management core to a flash interface layer core, the control circuit may search for a target command, to be processed before entering a power-off state, in a plurality of command queues that enqueue commands to be inputted to the memory device.

The control circuit may enqueue the target command into a top priority command queue having the highest priority among the plurality of command queues.

The control circuit may input a target command enqueued in the top priority command queue to the memory device before entering the power-off state.

The top priority command queue may be in an empty state before SPO occurs.

The target command may be for requesting an operation of writing meta-data.

The plurality of command queues may further include a first priority command queue and a second priority command queue. The control circuit may process a command in the first priority command queue with a higher priority than a command in the second priority command queue. After SPO occurs, the control circuit may enqueue a command for requesting an internal read operation into the first priority command queue.

The control circuit may enqueue the target command into the top priority command queue until a command for requesting to abort a corresponding operation is transmitted to the flash interface layer core.

The SPO signal may be directly transmitted from the power management core to the flash interface layer core.

In another aspect, embodiments of the present disclosure may provide a method of operating a memory system including a memory device and a memory controller configured to control the memory device.

The method of operating the memory system may include transmitting an SPO signal from a power management core to a flash interface layer core.

The method of operating the memory system may include searching for a target command, to be processed before entering a power-off state, in a plurality of command queues that queue commands to be inputted to the memory device.

The method of operating the memory system may include enqueuing the target command into a top priority command queue having the highest priority among the plurality of command queues.

The target command may be for requesting an operation of writing meta-data.

The plurality of command queues may further include a first priority command queue and a second priority command queue. A command included in the first priority command queue may be processed with higher priority than a command in the second priority command queue.

The method of operating the memory system may include inputting the target command enqueued into the top priority command queue to the memory device before entering a power-off state.

In another aspect, embodiments of the present disclosure may provide a memory system including a memory device and a memory controller including a first command queue having a first priority and second and third command queues.

The memory controller may enqueue multiple commands for the memory device in the second and third command queues.

The memory controller may identify a priority of each of the multiple commands in response to a sudden power off (SPO) signal.

The memory controller may move, from the at least one of the second and third command queues, a target command having the first priority to the first command queue.

The memory controller may move, from the third command queue, a command having a second priority to the second command queue.

The memory controller may provide the target command from the first command queue to the memory device.

According to the embodiments of the present disclosure, it is possible to reduce the time required to dump data to the memory device when SPO occurs.

In addition, according to embodiments of the present disclosure, it is possible to reduce the time required in the recovery process after the occurrence of SPO.

BRIEF DESCRIPTION OF THE DRAWINGS

The above and other aspects, features and advantages of the present disclosure will become more apparent from the following detailed description taken in conjunction with the accompanying drawings.

FIG. 10 is a diagram illustrating a comparison between examples of the types of commands enqueued in a command queue before and after the occurrence of SPO according to an embodiment of the present disclosure.

DETAILED DESCRIPTION OF THE EXEMPLARY EMBODIMENTS

Hereinafter, embodiments of the present disclosure are described in detail with reference to the accompanying drawings. Throughout the specification, reference to "an embodiment" or the like is not necessarily to only one embodiment, and different references to any such phrase are not necessarily to the same embodiment(s). The term "embodiment" when used herein does not necessarily refer to all embodiments.

Figure 1:
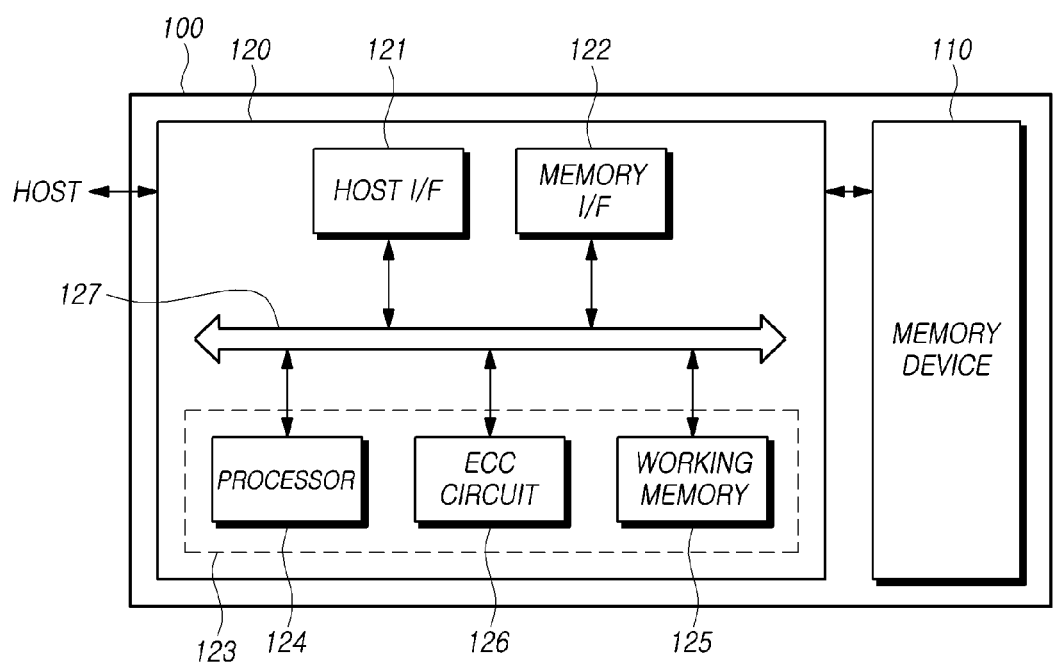
FIG. 1 is a schematic diagram illustrating a configuration of a memory system according to an embodiment of the present disclosure.

FIG. 1 is a schematic diagram illustrating a configuration of a memory system 100 according to an embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), an erase operation, and the like.

The memory device 110 may include a memory cell array including multiple memory cells (also simply referred to as "cells") configured to store data. The memory cell array may exist inside a memory block.

For example, the memory device 110 may be implemented as any of various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array selected using the address. That is, the memory device 110 may perform an operation corresponding to the received command in a memory area of the memory device having a physical address corresponding to the received address from the memory controller 120.

For example, the memory device 110 may perform a program operation, a read operation, an erase operation, and the like. During the program operation, the memory device 110 may program data in the area selected by the address. During the read operation, the memory device 110 may read data from the area selected by the address. During the erase operation, the memory device 110 may erase data stored in the area selected by the address.

The memory controller 120 may control write (or program), read, erase, and background operations with regard to the memory device 110. The background operation may include, for example, a garbage collection (GC) operation, a wear leveling (WL) operation, and/or a bad block management (BBM) operation.

The memory controller 120 may control the operation of the memory device 110 at the request of a host. Alternatively, the memory controller 120 may control the operation of the memory device 110 without a corresponding request of the host, such as, for example, when it performs one or more background operations of the memory device.

The memory controller 120 and the host may be separate devices. In some cases, the memory controller 120 and the host may be integrated and implemented as a single device. In the following description, the memory controller 120 and the host are separate devices.

The memory controller 120 may include a host interface (I/F) 121, a memory interface 122, and a control circuit 123.

The host interface 121 may be configured to provide an interface for communication with the host.

When receiving a command from the host (HOST), the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control the operation of the memory device 110 by performing operations to exercise overall control of the memory controller 120. For example, the control circuit 123 may include a processor 124 and a working memory 125. The control circuit 123 may further include an error detection and correction (detection/correction) circuit (i.e., ECC circuit) 126.

The processor 124 may control overall operation of the memory controller 120. The processor 124 may perform a logical operation. The processor 124 may communicate with the host through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, according to the mapping unit. Typical address mapping methods include a page mapping method, a block mapping method, and a hybrid mapping method.

The processor 124 may be configured to randomize data received from the host. For example, the processor 124 may randomize data received from the host by using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW) to control the operation of the memory controller 120. In other words, the processor 124 may control overall operation of the memory controller 120 and, in order to perform a logical operation, may execute (or drive) firmware loaded into the working memory 125 during booting.

The firmware refers to a program executed inside the memory system 100, and may include various functional layers.

For example, the firmware may include a flash translation layer (FTL), a host interface layer (HIL) and/or a flash interface layer (FIL). The FTL is configured to translate between a logical address that the host requests the memory system 100 to provide and a physical address of the memory device 110. The HIL is configured to interpret a command that the host issues to the memory system 100 (or storage device) and to deliver the same to the FTL. The FIL is configured to deliver a command issued by the FTL to the memory device 110.

For example, the firmware may be stored in the memory device 110, then loaded into the working memory 125.

The working memory 125 may store firmware, program codes, commands, or pieces of data to drive the memory controller 120. The working memory 125 may include, for example, a static RAM (SRAM), a dynamic RAM (DRAM), and/or a synchronous RAM (SDRAM) as a volatile memory.

The error detection/correction circuit 126 may be configured to detect an error bit of target data by using an error correction code, and to correct the detected error bit. For example, the target data may be data stored in the working memory 125, data retrieved from the memory device 110, or the like.

The error detection/correction circuit 126 may be implemented to decode data by using the error correction code. The error detection/correction circuit 126 may be implemented by using various code decoders. For example, a decoder that performs nonsystematic code decoding or a decoder that performs systematic code decoding may be used.

For example, the error detection/correction circuit 126 may detect an error bit, sector by sector, with regard to each piece of read data. That is, each piece of read data may include multiple sectors. As used herein, a sector may refer to a data unit smaller than the read unit (page) of a flash memory. Sectors constituting each piece of read data may correspond to each other via an address.

The error detection/correction circuit 126 may calculate a bit error rate (BER) and determine whether or not correction can be made sector by sector. For example, if the BER is greater than a reference value, the error detection/correction circuit 126 may determine that the corresponding sector is uncorrectable or "a fail". If the BER is less than or equal to the reference value, the error detection/correction circuit 126 may determine that the corresponding sector is correctable or "a pass".

The error detection/correction circuit 126 may perform error detection and correction operations successively with regard to all pieces of read data. When a sector in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various types of control signals and commands, and a data bus for delivering various types of data.

The above-mentioned constituent elements 121, 122, 124, 125, and 126 of the memory controller 120 are only provided as examples. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. In addition, in some cases, one or more other constituent elements may be added to the memory controller 120.

Hereinafter, the memory device 110 is described in more detail with reference to FIG. 2.

Figure 2:
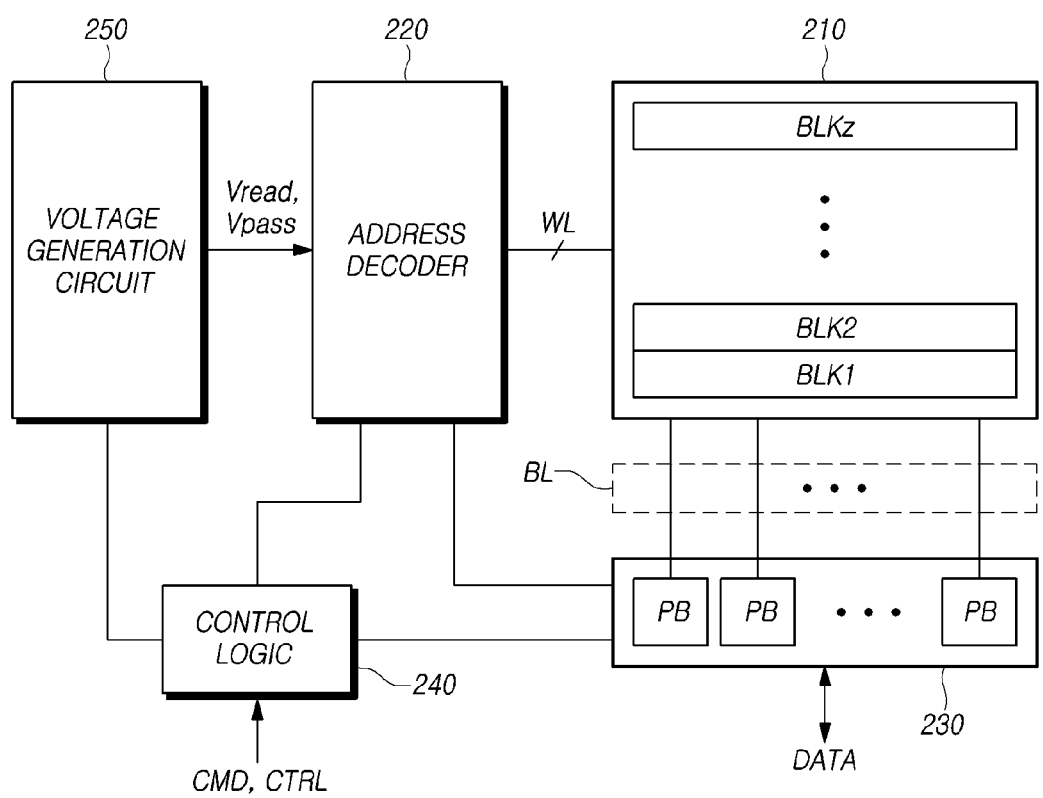
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 may include a memory cell array 210, an address decoder 220, a read and write (read/write) circuit 230, control logic 240, and a voltage generation circuit 250.

The memory cell array 210 may include multiple memory blocks BLK1-BLKz, where z is a natural number greater than or equal to 2.

In the multiple memory blocks BLK1-BLKz, multiple word lines WL and multiple bit lines BL may be disposed to form a grid-like structure, and multiple memory cells MC may be arranged at the intersections.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, which have a vertical channel structure.

The memory cell array 210 may be configured as a two-dimensional structure and, in some cases, may be configured as a three-dimensional structure.

Each of the multiple memory cells in the memory cell array 210 may store at least one bit of data. For example, each of the multiple memory cells in the memory cell array 210 may be a single-level cell (SLC) configured to store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells, each of which may be configured to store five or more bits of data.

The address decoder 220, the read/write circuit 230, the control logic 240, and the voltage generation circuit 250 may operate as a peripheral circuit configured to drive the memory cell array 210.

The address decoder 220 may be connected to the memory cell array 210 through the multiple word lines WL.

The address decoder 220 may be configured to operate in response to control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

During a read operation, the address decoder 220 may apply the read voltage Vread to a selected word line WL inside a selected memory block, and may apply the pass voltage Vpass to the remaining non-selected word lines WL.

During a program verification operation, the address decoder 220 may apply a verification voltage generated by the voltage generation circuit 250 to a selected word line WL inside a selected memory block, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some cases, may further include a cache buffer that operates in a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK in the memory device 110 may consist of multiple pages PG and multiple strings. The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (i.e., write operation) of the memory block may be performed page by page, and an erase operation may be performed memory block by memory block.

Figure 3:
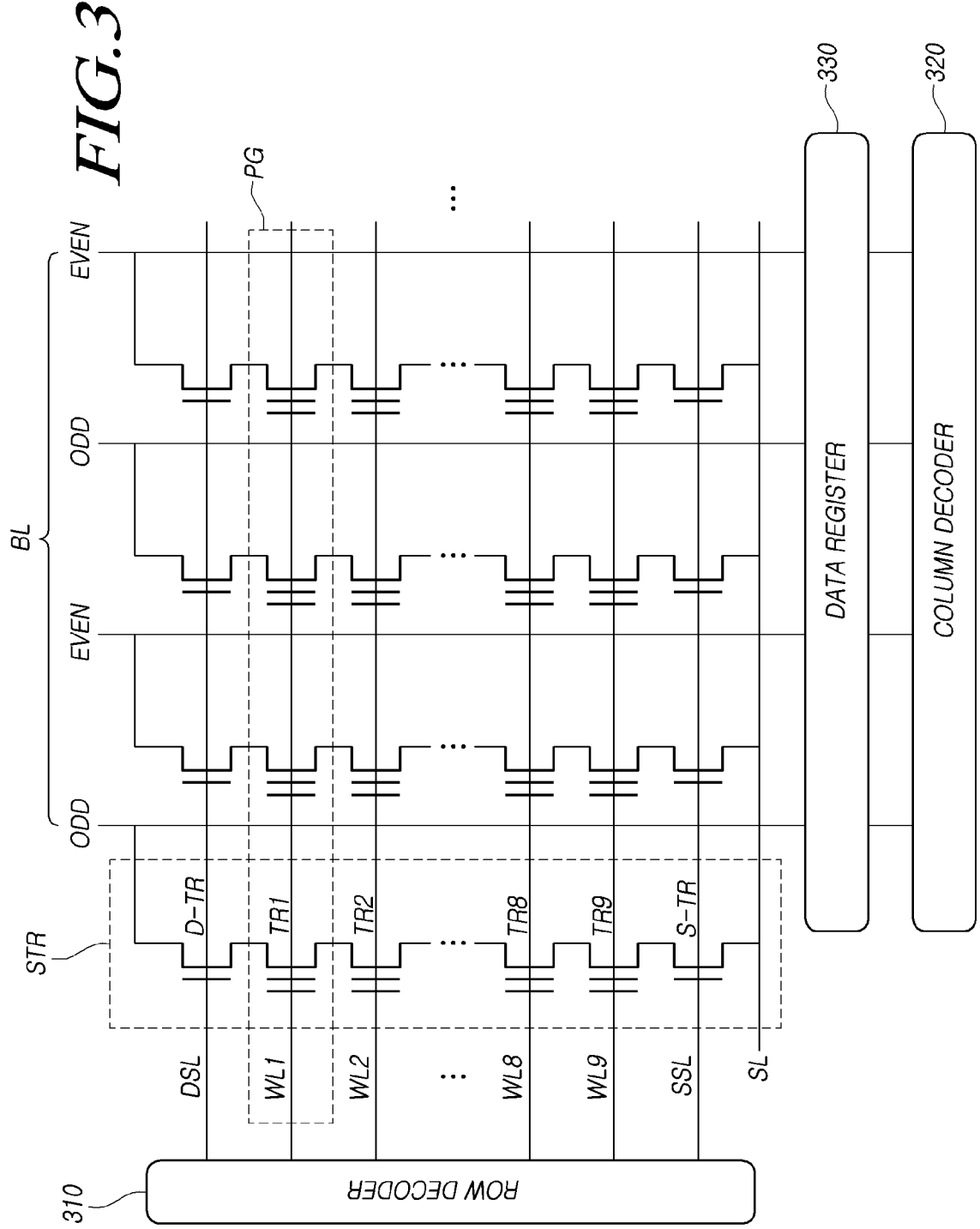
FIG. 3 is a diagram illustrating a structure of word lines and bit lines of a memory device according to an embodiment of the present disclosure.

FIG. 3 is a diagram illustrating a structure of word lines WL and bit lines BL of a memory device 110 according to an embodiment of the present disclosure.

Referring to FIG. 3, the memory device 110 has a core area in which memory cells MC are concentrated, and an auxiliary area which corresponds to the remaining area other than the core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 310. The bit lines BL may be connected to a column decoder 320. A data register 330, which corresponds to the read/write circuit 230 of FIG. 2, may be disposed between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 320 alternating between odd-numbered bit lines BL and even-numbered bit lines BL.

For accessing a memory cell MC, the address may be entered to the core area first through the input/output end and then through the row decoder 310 and the column decoder 320 such that a corresponding target memory cell can be designated. As used herein, designating a target memory cell refers to accessing one of the memory cells MC at an intersection between one of the word lines WL1-WL9 connected to the row decoder 310 and one of the bit lines BL connected to the column decoder 320, for programming data therein or for reading programmed data therefrom.

Pages PG in a first direction (for example, horizontal direction as depicted in FIG. 3) are bound by a commonly used line referred to as a word line WL, and strings STR in a second direction (for example, vertical direction as depicted in FIG. 3) are bound (i.e., connected) by a common line referred to as a bit line BL. As used herein, being commonly bound refers to being structurally connected by the same material and simultaneously receiving the same voltage during voltage application. The voltage applied to a memory cell MC in a position further down the series line among memory cells MC connected in series may slightly differ from the voltage applied to a memory cell MC further up the series line, due to the voltage drop across the preceding memory cell(s) MC.

The data register 330 plays an important role because all data processing by the memory device 110, including program and read operations, occurs via the data register 330. If data processing by the data register 330 is delayed, all of the other areas need to wait until the data register 330 finishes the data processing. In addition, degradation of performance of the data register 330 may degrade the overall performance of the memory device 110.

In the example illustrated in FIG. 3, in one string STR, multiple transistors TR1-TR9 may be connected to multiple word lines WL1-WL9, respectively. The multiple transistors TR1-TR9 correspond to memory cells MC. In this example, each of the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 in terms of the signal path among the two outermost word lines WL1 and WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 330. The second selection transistor S-TR plays the role of a switch that turns on or off the connection between the corresponding string STR and the source line SL. That is, the first selection transistor D-TR and the second selection transistor S-TR play the role of gatekeepers which are positioned on opposite ends of the corresponding string STR to deliver or block signals.

During a program operation, the memory system 100 fills the target memory cell MC of the bit line BL which is to be programmed with electrons. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may supply a voltage (for example, +20V) to the substrate through a source line SL during an erase operation. The memory system 100 floats both the first selection transistor D-TR and the second selection transistor S-TR during an erase operation, thereby generating an infinite resistance. As a result, the role of the first selection transistor D-TR and that of the second selection transistor S-TR may be removed, and electrons may operate only between the floating gate FG and the substrate due to the potential difference.

Figure 4:
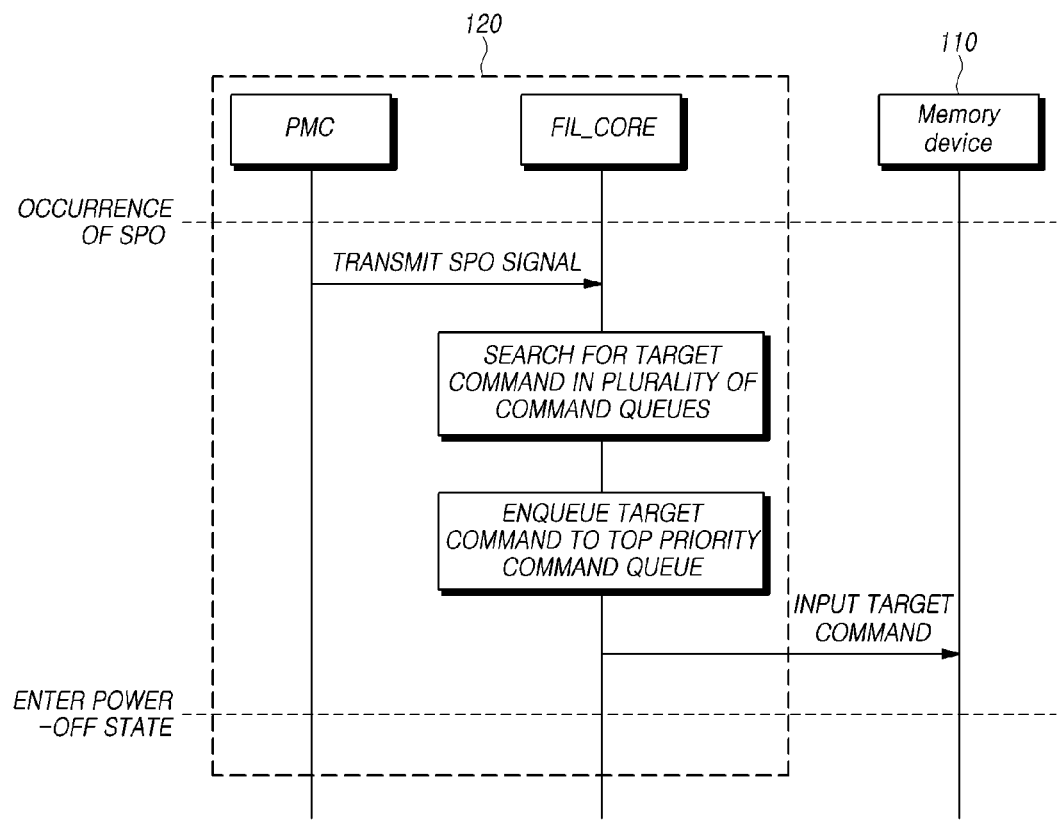
FIG. 4 illustrates operational flow of a memory system according to an embodiment of the present disclosure.

FIG. 4 illustrates operational flow of the memory system 100 according to an embodiment of the present disclosure.

Referring to FIG. 4, a power management core (PMC) of the memory controller 120 may transmit a sudden power off (SPO) signal indicating the occurrence of SPO to a flash interface layer core FIL_CORE when SPO occurs.

The PMC is a core for controlling an operation related to power supplied to the memory system 100, and may be one of a plurality of cores in the processor 124 of FIG. 1. The flash interface layer core FIL_CORE is a core that executes the functions of the aforementioned flash interface layer FIL, and may be one of a plurality of cores in the processor 124.

In some embodiments, the PMC may recognize the occurrence of SPO through a signal (e.g., GPIO interrupt) generated externally of the memory system 100. When recognizing the occurrence of SPO, the PMC may transmit the SPO signal indicating the occurrence of SPO to other cores of the memory controller 120.

The SPO signal generated by the PMC may be transmitted to other cores of the memory controller 120 in the form of an electrical signal at a certain level (i.e., a signal with a low or high level), a message indicating the occurrence of SPO, or the like.

When SPO occurs, the memory system 100 may execute an operation of dumping a portion of data loaded in a volatile memory (e.g., the working memory 125) into the memory device 110. At this time, since power is not normally supplied to the memory system 100 from an external source, the memory system 100 may use the power supplied from an emergency power supply device such as a capacitor to execute the operation of dumping a portion of data loaded in the volatile memory into the memory device 110.

However, since the amount of power supplied from the emergency power supply device is limited, the memory system 100 may perform, at the time of power-on following SPO occurrence, only operations to recover the memory system 100 to a state before the occurrence of SPO, and may abort the remaining operations.

To this end, the flash interface layer core FIL_CORE of the memory controller 120 may search for a target command in a plurality of command queues after receiving the SPO signal from the PMC.

The plurality of command queues may enqueue a command to be input to the memory device 110. The memory controller 120 may enqueue the corresponding command in the command queue before inputting the command to the memory device 110 to perform a specific operation. This is to manage the order in which each of the plurality of commands is input to the memory device 110 when there are a plurality of commands to be input to the memory device 110 by the memory controller 120.

That the command queue enqueues a command means that the command queue stores the corresponding command therein. Conversely, that the command queue dequeues a command means that the command queue deletes or otherwise removes the corresponding command.

The target command ensures that the memory system 100 is processed as needed before entering a power-off state after the occurrence of SPO. That is, even when SPO occurs, the memory system 100 may ensure that the target command is not aborted and is processed before entering the power-off state.

To this end, the memory controller 120 may reorder the execution order of the commands enqueued in the command queue so that the target command can be processed prior to other commands. In this case, the memory controller 120 may reorder the execution order of the commands using a method of dequeuing the target command and then enqueuing the dequeued target command into the command queue having the highest priority.

Specifically, the flash interface layer core FIL_CORE of the memory controller 120 may enqueue the target command found in the search in a top priority command queue, i.e., the command queue having the highest priority among the plurality of command queues. The target command enqueued in the top priority command queue may be input to the memory device 110 prior to the commands enqueued into other command queues. The flash interface layer core FIL_CORE of the memory controller 120 may process the target command without aborting the same before entering the power-off state, even though the flash interface layer core FIL_CORE receives a command for requesting to abort the corresponding operation. On the other hand, the flash interface layer core FIL_CORE of the memory controller 120 does not process the commands enqueued in the other command queues before entering the power-off state when receiving the command for requesting to abort the corresponding operation.

In order to process the target command before entering the power-off state, the memory system 100 may control the target command to be processed prior to the other commands by enqueuing the target command in the top priority command queue.

The flash interface layer core FIL_CORE of the memory controller 120 may input the target command enqueued in the top priority command queue to the memory device 110 before entering the power-off state.

Figure 5:
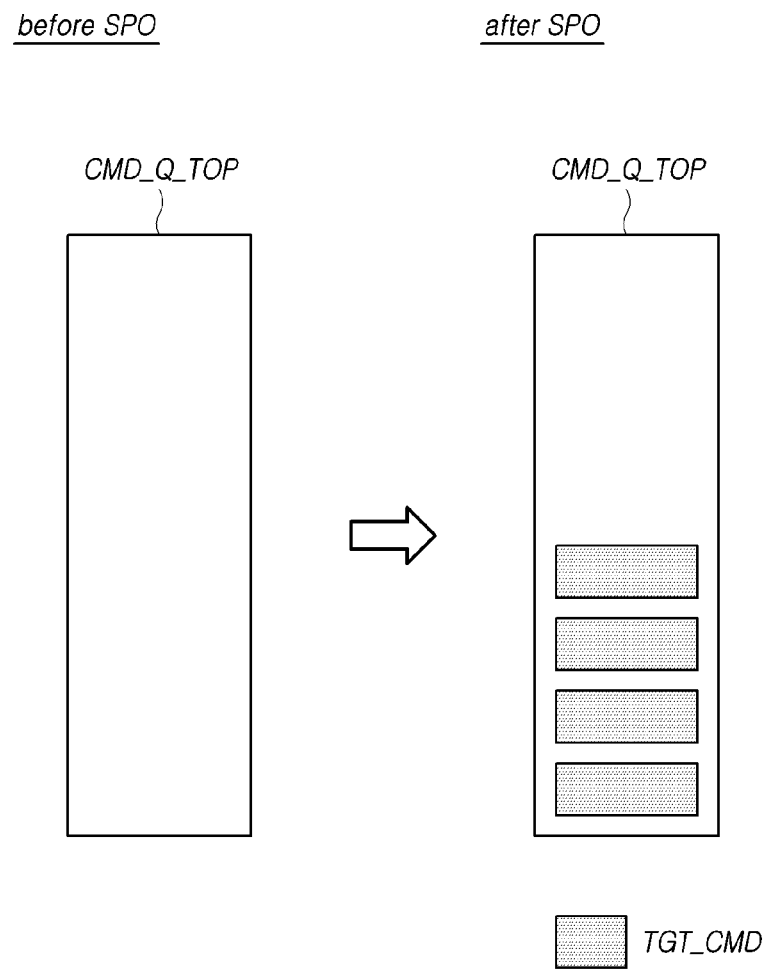
FIG. 5 is a diagram illustrating a top priority command queue according to an embodiment of the present disclosure.

FIG. 5 is a diagram illustrating a top priority command queue CMD_Q_TOP according to an embodiment of the present disclosure.

In some embodiments of the present disclosure, the top priority command queue CMD_Q_TOP is in an empty state before the occurrence of SPO. That is, before SPO occurrence, the memory controller 120 may not enqueue any command in the top priority command queue CMD_Q_TOP before the occurrence of SPO, but may enqueue a command into any of the other command queues (i.e., excluding the top priority command queue CMD_Q_TOP). Through this, the memory controller 120 may maintain the top priority command queue CMD_Q_TOP in the empty state before the occurrence of SPO.

After SPO occurs, the target command TGT_CMD may be enqueued in the top priority command queue CMD_Q_TOP. The memory controller 120 may enqueue the target command TGT_CMD in the top priority command queue CMD_Q_TOP after the occurrence of SPO, and may then input the target command TGT_CMD to the memory device 110 to control an operation requested by the target command TGT_CMD to be processed. That is, the top priority command queue CMD_Q_TOP may be used after the occurrence of SPO.

The type of the target command TGT_CMD enqueued in the top priority command queue CMD_QTOP may vary depending on the situation and/or operating conditions. For example, the target command TGT_CMD may be for requesting an operation of writing meta-data. The meta-data may be generated by the memory controller 120 to manage data stored on the memory system 100. For example, the meta-data may include mapping information between a logical address on a host and a physical address on the memory device 110, or information for managing the memory space of the memory device 110.

The reason for processing the command for requesting the operation for writing meta-data when SPO occurs with higher priority at the time of the occurrence of SPO is as follows.

When the memory system 100 is in a power-off state while failing to write meta-data to be written to the memory device 110 at the time of the occurrence of SPO, the memory system 100 is required to perform an operation of scanning meta-data that has not been written. This is because if the meta-data is not written to the memory device 110, data associated with the meta-data cannot be normally accessed.

Therefore, when the operation of writing the meta-data is completed before entering the power-off state after the occurrence of SPO, there is no need for the memory system 100 to perform the operation of scanning the meta-data in a power-on process afterwards, thereby reducing the time required in the recovery process after the occurrence of SPO.

Figure 6:
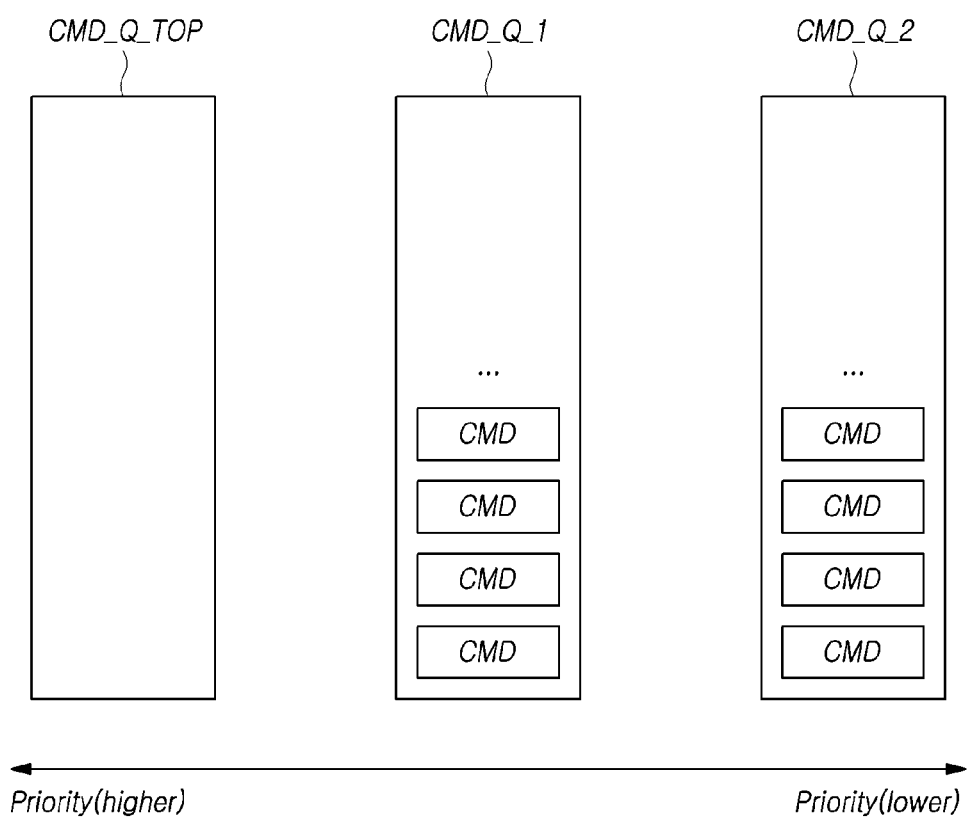
FIG. 6 is a diagram illustrating an example of the state of a plurality of command queues before the occurrence of sudden power off (SPO) according to an embodiment of the present disclosure.

FIG. 6 is a diagram illustrating an example of the state of a plurality of command queues before the occurrence of SPO according to an embodiment of the present disclosure.

The plurality of command queues may include a first priority command queue CMD_Q_1 and a second priority command queue CMD_Q_2, as well as the top priority command queue CMD_Q_TOP described above.

The memory controller 120 may process a command enqueued in the first priority command queue CMD_Q_1 with a higher priority than a command enqueued in the second priority command queue CMD_Q_2. That is, the command enqueued in the first priority command queue CMD_Q_1 is processed prior to the command enqueued in the second priority command queue CMD_Q_2.

In the illustrated example of FIG. 6, among the plurality of command queues, the top priority command queue CMD_Q_TOP has the highest priority, the first priority command queue CMD_Q_1 has the next highest priority, and the second priority command queue CMD_Q_2 has the lowest priority. However, as described above with reference to FIG. 5, before the occurrence of SPO, the top priority command queue CMD_Q_TOP is in an empty state.

Figure 7:
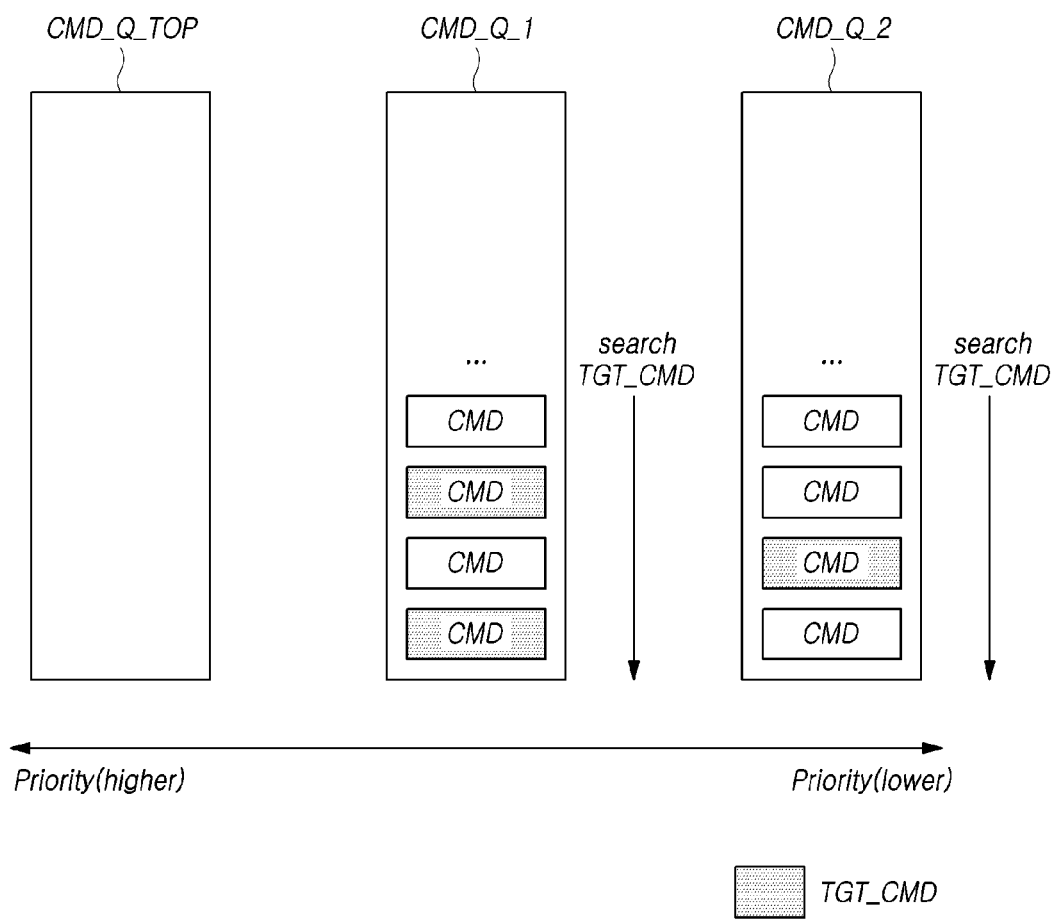
FIG. 7 is a diagram illustrating an example of an operation of searching for a target command in command queue(s) after the occurrence of SPO according to an embodiment of the present disclosure.

FIG. 7 is a diagram illustrating an example of an operation of searching for a target command in command queue(s) after the occurrence of SPO according to an embodiment of the present disclosure.

Referring to FIG. 7, after SPO occurs, the flash interface layer core FIL_CORE of the memory controller 120 may search for a target command TGT_CMD among commands enqueued in the first priority command queue CMD_Q_1 and commands enqueued in the second priority command queue CMD_Q_2.

As described above, the target command TGT_CMD may be, for example, a command for requesting an operation of writing meta-data.

Since the time required for processing the command for requesting the operation of writing the meta-data is longer than the time required for processing a command for reading data, the target command may be enqueued only in the second priority command queue CMD_Q_2 before the occurrence of SPO. In this case, when the flash interface layer core FIL_CORE of the memory controller 120 searches for the target command TGT_CMD after the occurrence of SPO, the process of searching for the target command TGT_CMD in the first priority command queue CMD_Q_1 can be omitted.

Figure 8:
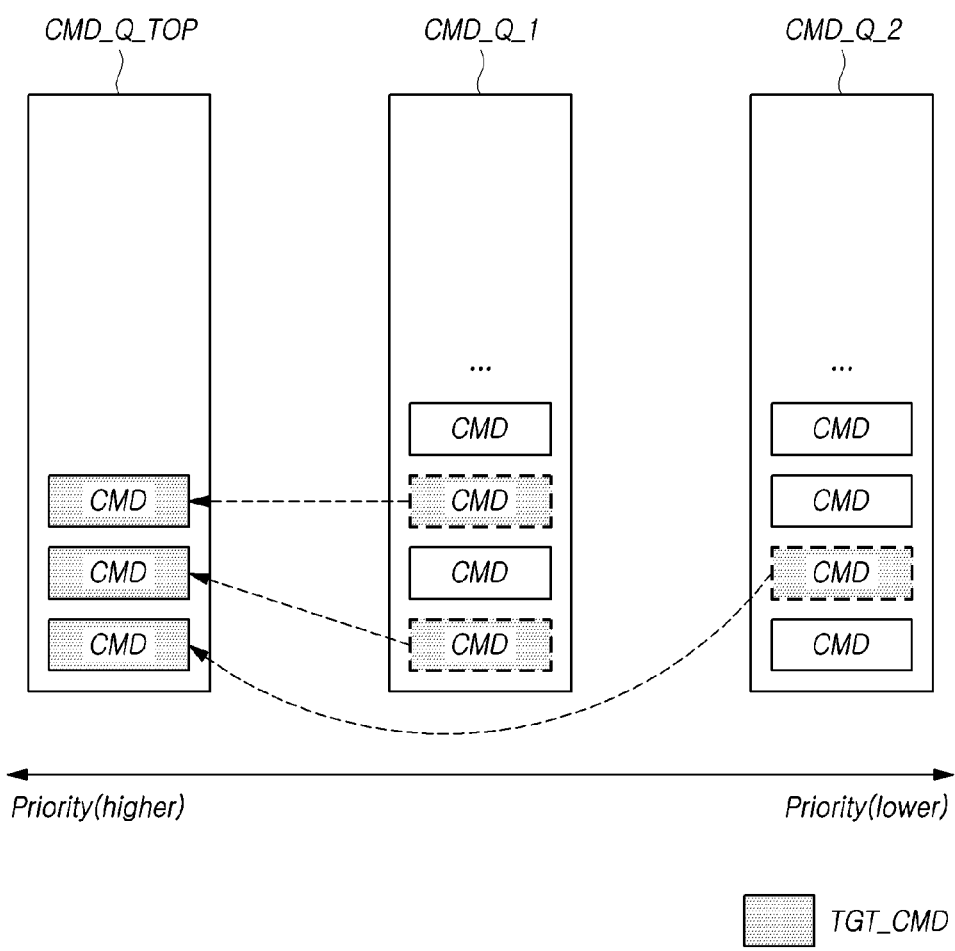
FIG. 8 is a diagram illustrating an example of an operation of enqueuing a target command in a top priority command queue after the occurrence of SPO according to an embodiment of the present disclosure.

FIG. 8 is a diagram illustrating an example of an operation of enqueuing a target command TGT_CMD in a top priority command queue CMD_Q_TOP after the occurrence of SPO according to an embodiment of the present disclosure.

Referring to FIG. 8, the flash interface layer core FIL_CORE of the memory controller 120 may enqueue the target command TGT_CMD, identified from the search, from the first priority command queue CMD_Q_1 and the second priority command queue CMD_Q_2 to the top priority command queue CMD_Q_TOP.

Figure 9:
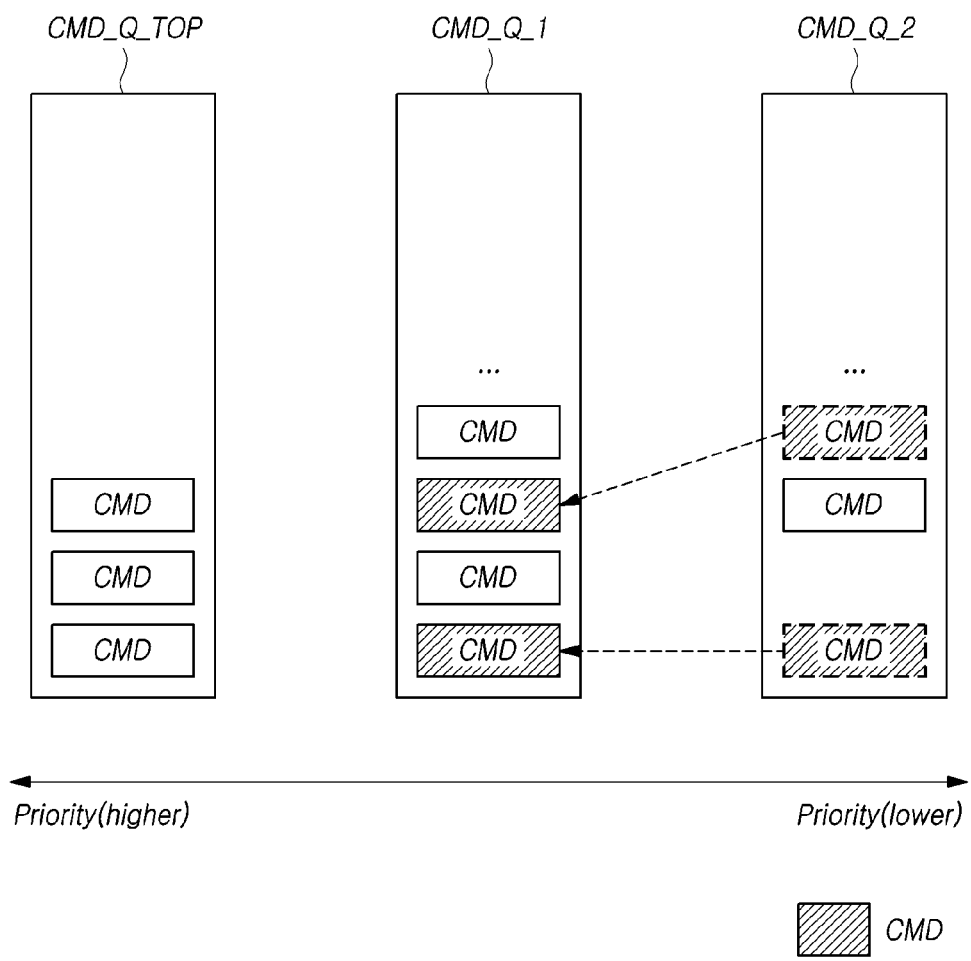
FIG. 9 is a diagram illustrating an example of an operation of enqueuing a command enqueued in a second priority command queue into a first priority command queue after the occurrence of SPO according to an embodiment of the present disclosure.

FIG. 9 is a diagram illustrating an example of an operation of enqueuing a command, presently enqueued in a second priority command queue, in a first priority command queue after the occurrence of SPO according to an embodiment of the present disclosure.

Referring to FIG. 9, the flash interface layer core FIL_CORE of the memory controller 120 may enqueue a command, to be processed with a higher priority among commands enqueued in the second priority command queue CMD_Q_2, from the second priority command queue CMD_Q_2 to a first priority command queue CMD_Q_1.

Among the commands enqueued in the second priority command queue CMD_Q_2, the commands enqueued into the first priority command queue CMD_Q_1 may be for requesting an internal read operation. Unlike a host read operation for responding to a read request from a host, the command for requesting the internal read operation is a command generated by the memory controller 120 by itself to perform operations such as garbage collection (GC), wear leveling (WL), read reclaim (RR), and the like. Before the occurrence of SPO, in order to process the read operation requested by the host faster, the flash interface layer core FIL_CORE of the memory controller 120 may enqueue a command for requesting a host read operation in the first priority command queue CMD_Q_1, and may enqueue a command for requesting an internal read operation in the second priority command queue CMD_Q_2.

As such, the reason that the memory controller 120 processes the command for requesting the internal read operation with a higher priority after the occurrence of SPO is because the time required for the processing is relatively short compared to a program operation or an erase operation.

The flash interface layer core FIL_CORE of the memory controller 120 may enqueue a command, to be processed with a lower priority at the time of the occurrence of SPO among the commands enqueued in the first priority command queue CMD_Q_1, from the first priority command queue CMD_Q_1 to the second priority command queue CMD_Q_2.

The flash interface layer core FIL_CORE of the memory controller 120 may delete, from the first priority command queue CMD_Q_1, a command to be processed with a lower priority at the time of the occurrence of SPO among the commands enqueued in the first priority command queue CMD_Q_1, thereby minimizing the possibility that another command (e.g., a command for requesting an internal read operation) enqueued in the first priority command queue CMD_Q_1 is not executed at the time of power off.

The memory controller 120 may determine a command that can be processed with a lower priority when SPO occurs, in various ways.

In an embodiment, the flash interface layer core FIL_CORE of the memory controller 120 may enqueue a command of a particular type, among commands enqueued in the first priority command queue CMD_Q_1 at the time of the occurrence of SPO, from the first priority command queue CMD_Q_1 to the second priority command queue CMD_Q_2. For example, the flash interface layer core FIL_CORE of the memory controller 120 may enqueue a command for requesting a host read operation at the time of the occurrence of SPO from the first priority command queue CMD_Q_1 to the second priority command queue CMD_Q_2.

In another embodiment, the flash interface layer core FIL_CORE of the memory controller 120 may enqueue a command accessing a specific region of the memory device 110 at the time of the occurrence of SPO from the first priority command queue CMD_Q_1 to the second priority command queue CMD_Q_2. For example, the flash interface layer core FIL_CORE of the memory controller 120 may enqueue a command accessing a cold data area of the memory device 110 at the time of the occurrence of SPO from the first priority command queue CMD_Q_1 to the second priority command queue CMD_Q_2. The cold data area may be defined as an area in which the number of times data is read by a host in a unit time is less than or equal to a threshold number of times.

In another embodiment, the flash interface layer core FIL_CORE of the memory controller 120 may enqueue a command for reading a large amount of data at the time of the occurrence of SPO from the first priority command queue CMD_Q_1 to the second priority command queue CMD_Q_2. For example, the flash interface layer core FIL_CORE of the memory controller 120 may enqueue 1) a command for reading data of a threshold amount or more or 2) a command for reading data of the largest amount at the time of the occurrence of SPO from the first priority command queue CMD_Q_1 to the second priority command queue CMD_Q_2. Through this, the flash interface layer core FIL_CORE of the memory controller 120 may process more commands for reading low-quantity data that may be quickly processed when SPO occurs.

FIG. 10 is a diagram illustrating a comparison between examples of the types of commands enqueued into a command queue before and after the occurrence of SPO according to an embodiment of the present disclosure.

Referring to FIG. 10, the top priority command queue CMD_Q_TOP is empty before SPO occurs, and a command for requesting a host read operation may be enqueued in the first priority command queue CMD_Q_1. A command for requesting an internal read operation, a command for requesting a program operation, a command for an erase operation, and a command for requesting an operation of writing meta-data may be enqueued in the second priority command queue CMD_Q_2. In this case, the command for requesting the host read operation may be processed first.

However, after SPO occurs, the command for requesting the operation of writing meta-data may be enqueued in the top priority command queue CMD_Q_TOP, and the command for requesting the host read operation and the command for requesting the internal read operation may be enqueued in the first priority command queue CMD_Q_1. In addition, the command for requesting the program operation and the command for requesting the erase operation may remain enqueued in the second priority command queue CMD_Q_2. In this case, the command for requesting the operation of writing meta-data may be processed first, and then the command for requesting the host read operation and the command for requesting the internal read operation may be processed.

Figure 11:
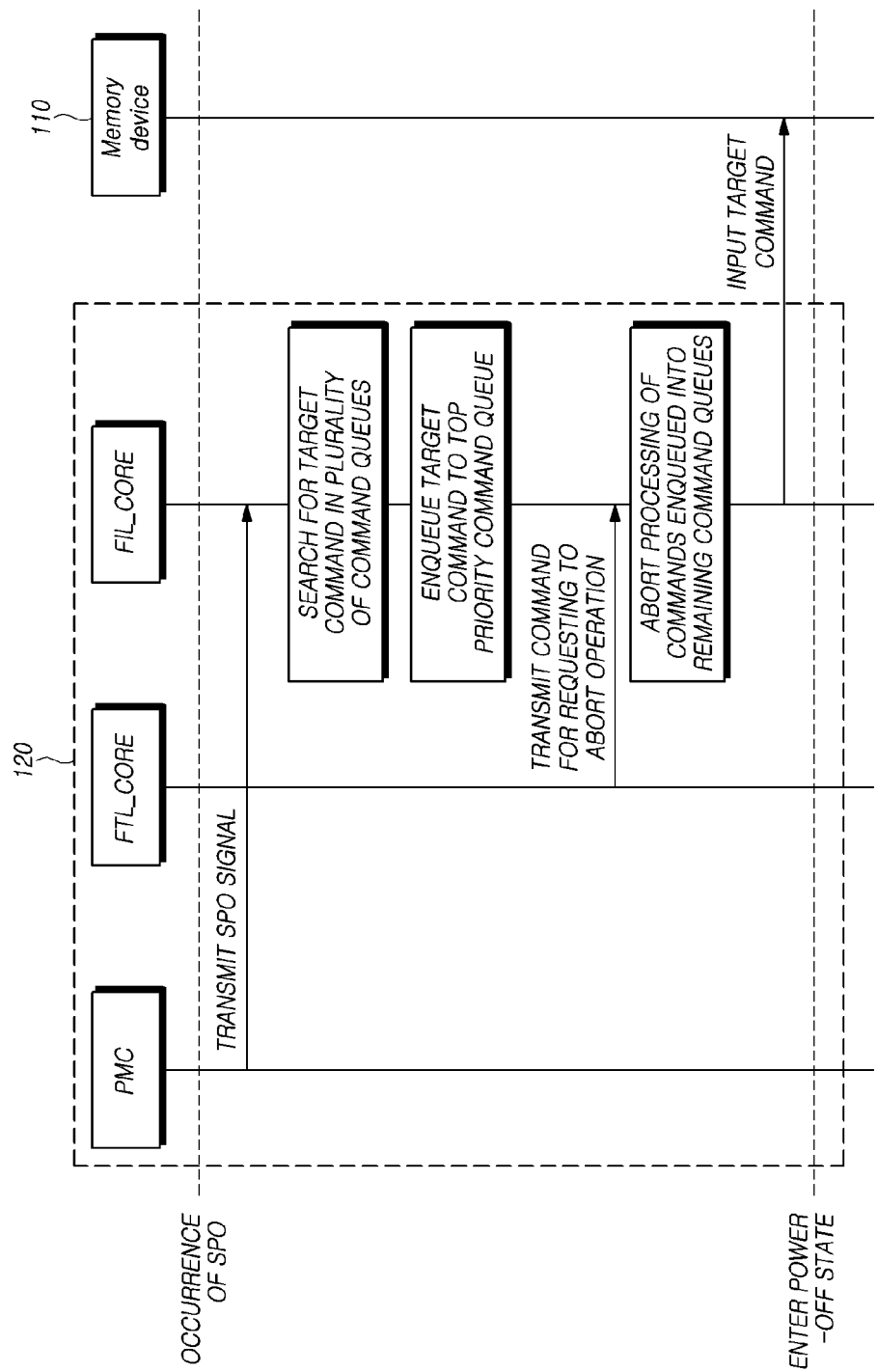
FIG. 11 illustrates operational flow of a memory system according to an embodiment of the present disclosure.

FIG. 11 illustrates a flow of the operation of the memory system 100 according to an embodiment of the present disclosure.

Referring to FIG. 11, the power management core (PMC) of the memory controller 120 may directly transmit an SPO signal indicating the occurrence of SPO to the flash interface layer core FIL_CORE when SPO occurs. That is, the SPO signal generated from the PMC may be directly transmitted to the flash interface layer core FIL_CORE without passing through a core performing the function of another layer (e.g., host interface layer (HIL) or flash translation layer (FTL)).

The flash interface layer core FIL_CORE, which directly receives the SPO signal generated from the PMC, may search for a target command in the plurality of command queues as described above with reference to FIG. 4. Further, the flash interface layer core FIL_CORE may input the target command found in the search to the top priority command queue, that is, the command queue having the highest priority among the plurality of command queues.

In some embodiments, another core of the memory controller 120 may also receive information indicating that SPO has occurred from the PMC. For example, the flash translation layer core FTL_CORE performing a flash translation layer (FTL) function may receive the SPO signal directly from the PMC or may receive information indicating that SPO has occurred through another core. The flash translation layer core FTL_CORE may be one of the plurality of cores included in the processor 124, similar to the PMC and the flash interface layer core FIL_CORE.

The flash translation layer core FTL_CORE may transmit a command for requesting to abort a corresponding operation to the flash interface layer core FIL_CORE. The flash interface layer core FIL_CORE may abort an operation of processing commands enqueued in the other command queues (excluding the top priority command queue) after receiving the command for requesting to abort the corresponding operation.

The flash interface layer core FIL_CORE may input the target command enqueued in the top priority command queue to the memory device 110. In connection with FIG. 11, a case in which the target command is input to the memory device 110 after the flash interface layer core FIL_CORE receives the command for requesting to abort the corresponding operation is described. However, the target command that has been already enqueued at the top priority command queue may be input to the memory device 110 before the flash interface layer core FIL_CORE receives the command for requesting to abort the corresponding operation.

Figure 12:
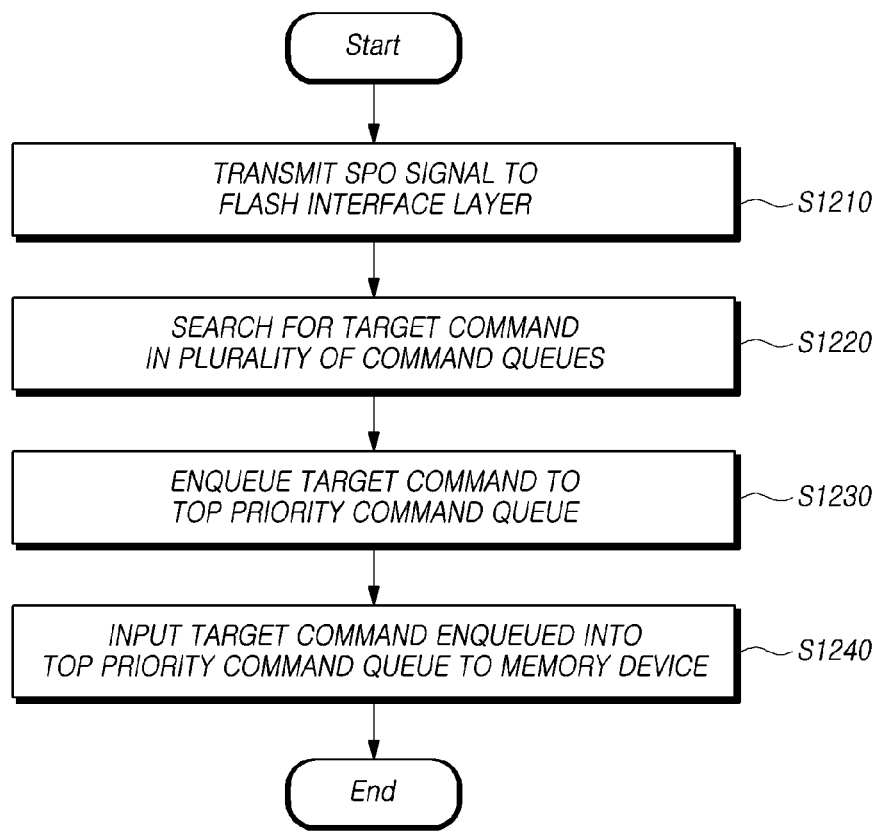
FIG. 12 is a flowchart illustrating a method of operating a memory system according to an embodiment of the present disclosure.

FIG. 12 is a flowchart illustrating a method of operating the memory system 100 according to embodiments of the present disclosure.

Referring to FIG. 12, the method of operating the memory system 100 may include transmitting an SOP signal from the PMC to the flash interface layer core FIL_CORE in operation S1210.

Next, the method of operating the memory system 100 may include searching a plurality of command queues for a target command TGT_CMD to be processed before entering a power-off state in operation S1220. In some embodiments, the target command TGT_CMD may be for requesting an operation of writing meta-data.

Next, the method of operating the memory system 100 may include enqueuing the target command TGT_CMD found in the search operation S1220 in a top priority command queue CMD_Q_TOP having the highest priority among the plurality of command queues in operation S1230.

In some embodiments, the plurality of command queues may further include a first priority command queue CMD_Q_1 and a second priority command queue CMD_Q_2 in addition to the top priority command queue CMD_Q_TOP. A command in the first priority command queue CMD_Q_1 may be processed with a higher priority than a command in the second priority command queue CMD_Q_2.

Next, the method of operating the memory system 100 may include inputting the target command TGT_CMD, which is enqueued in the top priority command queue CMD_Q_TOP, to the memory device 110 before entering a power-off state in operation S1240.

The above-described operation of the memory controller 120 may be controlled by the control circuit 123, and the processor 124 may be controlled in a manner in which various operations of the memory controller 120 execute (i.e., drive) programmed firmware.

Figure 13:
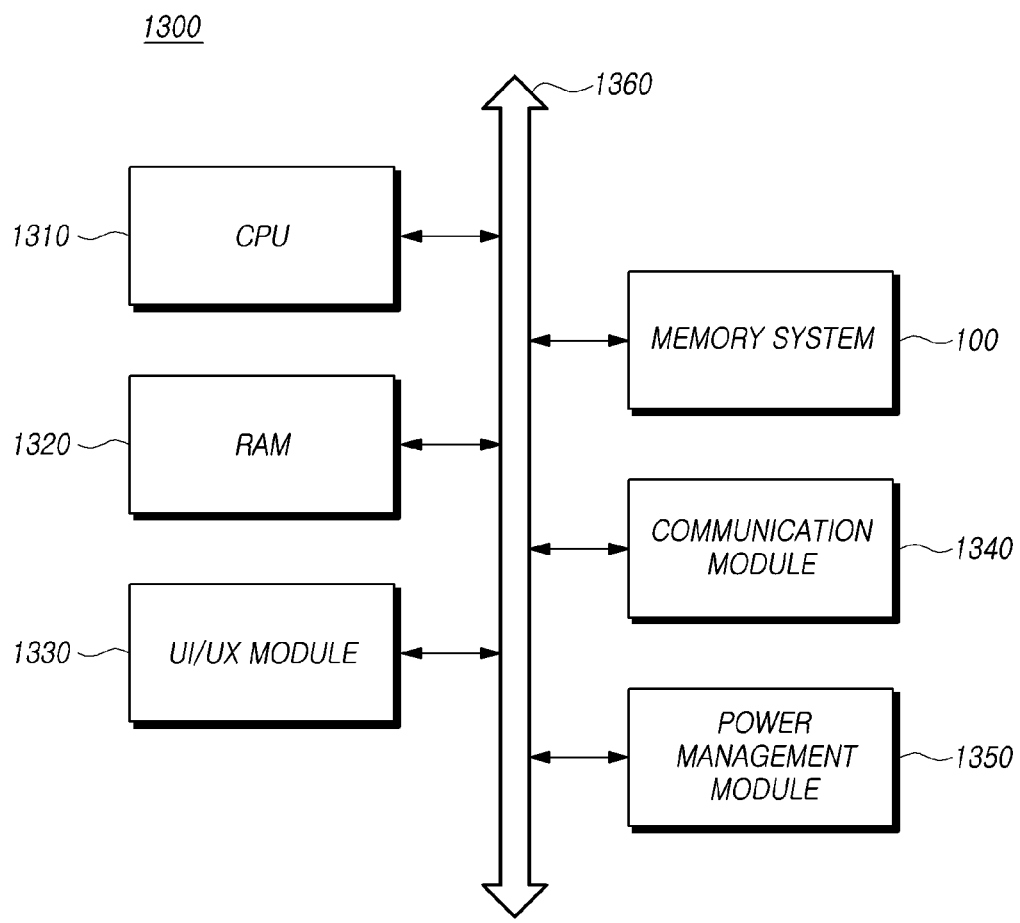
FIG. 13 is a diagram illustrating a configuration of a computing system according to an embodiment of the present disclosure.

FIG. 13 is a diagram illustrating a configuration of a computing system 1300 according to an embodiment of the present disclosure.

Referring to FIG. 13, the computing system 1300 may include: a memory system 100 electrically connected to a system bus 1360; a central processing unit (CPU) 1310 configured to control overall operation of the computing system 1300; a random access memory (RAM) 1320 configured to store data and information related to operations of the computing system 1300; a user interface/user experience (UI/UX) module 1330 configured to provide the user with a user environment; a communication module 1340 configured to communicate with an external device via a wired connection and/or wirelessly; and a power management module 1350 configured to manage power used by the computing system 1300.

The computing system 1300 may be a personal computer (PC) or may include a mobile terminal such as a smartphone, a tablet or any of various other electronic devices.

The computing system 1300 may further include a battery for supplying an operating voltage, an application chipset, a graphic-related module, a camera image processor, and a DRAM. The computing system 1300 may include one or more other elements as those skilled in the art understand.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as any of various storage devices, which may be mounted inside any of various electronic devices.

According to embodiments of the present disclosure described above, the operation delay time of the memory system may be minimized. In addition, according to an embodiment of the present disclosure, overhead occurring in the process of calling a specific function may be minimized. Although various embodiments of the present disclosure have been illustrated and described, those skilled in the art will appreciate that various modifications, additions and substitutions are possible, without departing from the scope and spirit of the invention as set forth in the accompanying claims. While embodiments of the present disclosure have been described for the sake of brevity and clarity, the scope of the present invention encompasses all variations that fall within the scope the claims including their equivalents.

What is claimed is:

1. A memory system comprising:
   a memory device; and
   a memory controller configured to control the memory device,
   wherein the memory controller
   searches for a target command, to be processed before entering a power-off state, in a plurality of command queues that queue commands to be inputted to the memory device when a sudden power off (SPO) signal is transmitted from a power management core to a flash interface layer core,
   enqueues the target command in a top priority command queue having the highest priority among the plurality of command queues, and
   inputs the target command enqueued in the top priority command queue to the memory device before entering the power-off state.

2. The memory system of claim 1, wherein the top priority command queue is in an empty state before SPO occurs.

3. The memory system of claim 1, wherein the target command is for requesting an operation of writing meta-data.

4. The memory system of claim 1, wherein the plurality of command queues further comprise a first priority command queue and a second priority command queue, and the memory controller processes a command in the first priority command queue with a higher priority than a command in the second priority command queue.

5. The memory system of claim 4, wherein the memory controller enqueues a command for requesting an internal read operation in the first priority command queue after SPO occurs.

6. The memory system of claim 4, wherein the memory controller enqueues, in the second priority command queue, a command to be processed with a lower priority at the time of the occurrence of SPO than commands enqueued in the first priority command queue.

7. The memory system of claim 1, wherein the memory controller enqueues the target command in the top priority command queue until a command for requesting to abort a corresponding operation is transmitted to the flash interface layer core.

8. The memory system of claim 1, wherein the SPO signal is directly transmitted from the power management core to the flash interface layer core.

9. A memory controller comprising:
   a memory interface configured to communicate with a memory device; and
   a control circuit configured to control the memory device,
   wherein the control circuit
   searches for a target command, to be processed before entering a power-off state, in a plurality of command queues that queue commands to be inputted to the memory device when a sudden power off (SPO) signal is transmitted from a power management core to a flash interface layer core,
   enqueues the target command in a top priority command queue having the highest priority among the plurality of command queues, and
   inputs a target command enqueued in the top priority command queue to the memory device before entering the power-off state.

10. The memory controller of claim 9, wherein the top priority command queue is in an empty state before SPO occurs.

11. The memory controller of claim 9, wherein the target command is for requesting an operation of writing meta-data.

12. The memory controller of claim 9, wherein the plurality of command queues further comprise a first priority command queue and a second priority command queue, and the control circuit processes a command in the first priority command queue with a higher priority than a command in the second priority command queue.

13. The memory controller of claim 12, wherein the control circuit enqueues a command for requesting an internal read operation in the first priority command queue after SPO occurs.

14. The memory controller of claim 12, wherein the control circuit enqueues, in the second priority command queue, a command to be processed with a lower priority at the time of the occurrence of SPO than commands in the first priority command queue.

15. The memory controller of claim 9, wherein the control circuit enqueues the target command in the top priority command queue until a command for requesting to abort a corresponding operation is transmitted to the flash interface layer core.

16. The memory controller of claim 9, wherein the SPO signal is directly transmitted from the power management core to the flash interface layer core.

17. A method of operating a memory system comprising a memory device, the method comprising:
   transmitting a sudden power off (SPO) signal from a power management core to a flash interface layer core;
   searching for a target command, to be processed before entering a power-off state, in a plurality of command queues that queue commands to be inputted to the memory device;
   enqueuing the target command in a top priority command queue with the highest priority among the plurality of command queues; and
   inputting the target command enqueued in the top priority command queue to the memory device before entering the power-off state.

18. The method of claim 17, wherein the target command is for requesting an operation of writing meta-data.

19. The method of claim 17, wherein the plurality of command queues further comprise a first priority command queue and a second priority command queue, and a command in the first priority command queue is processed with a higher priority than a command in the second priority command queue.

* * * * *